Patented Sept. 12, 1933

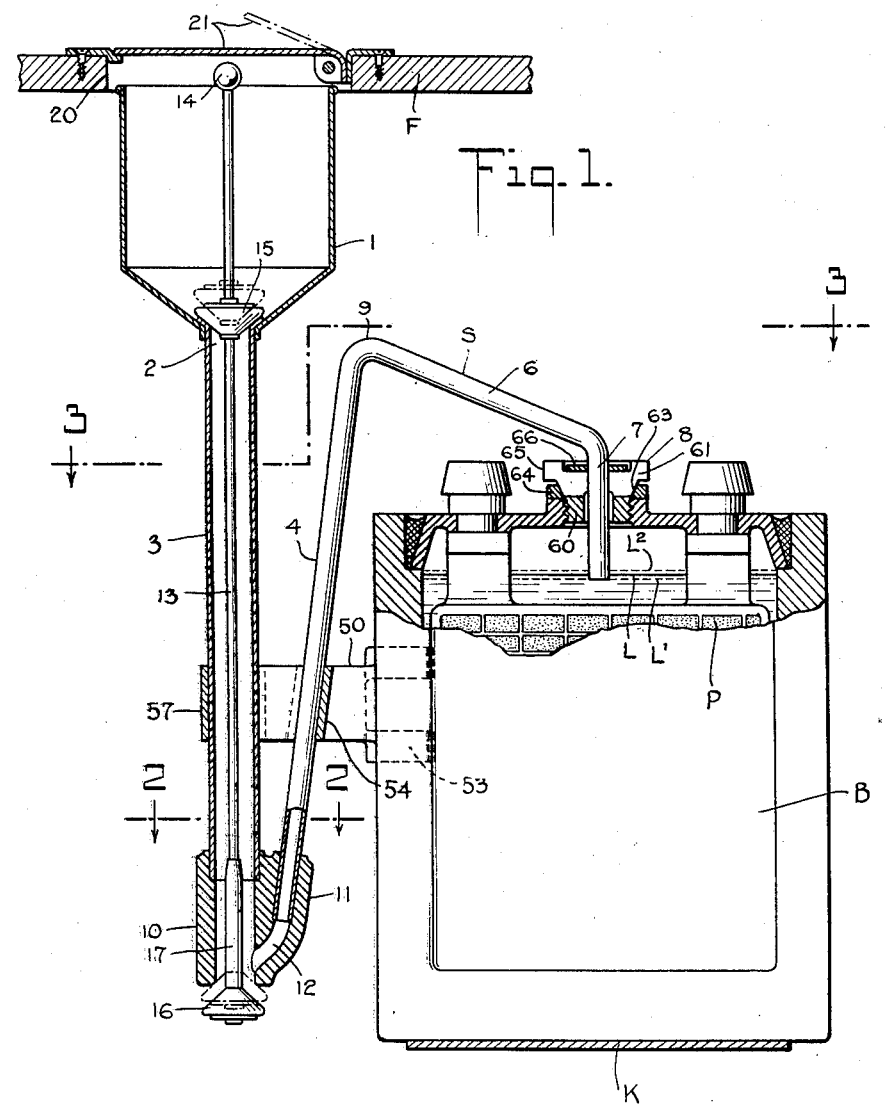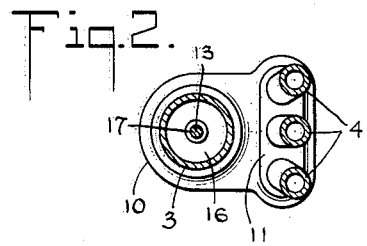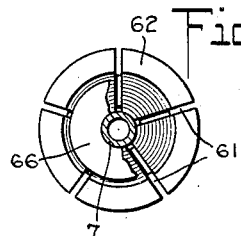

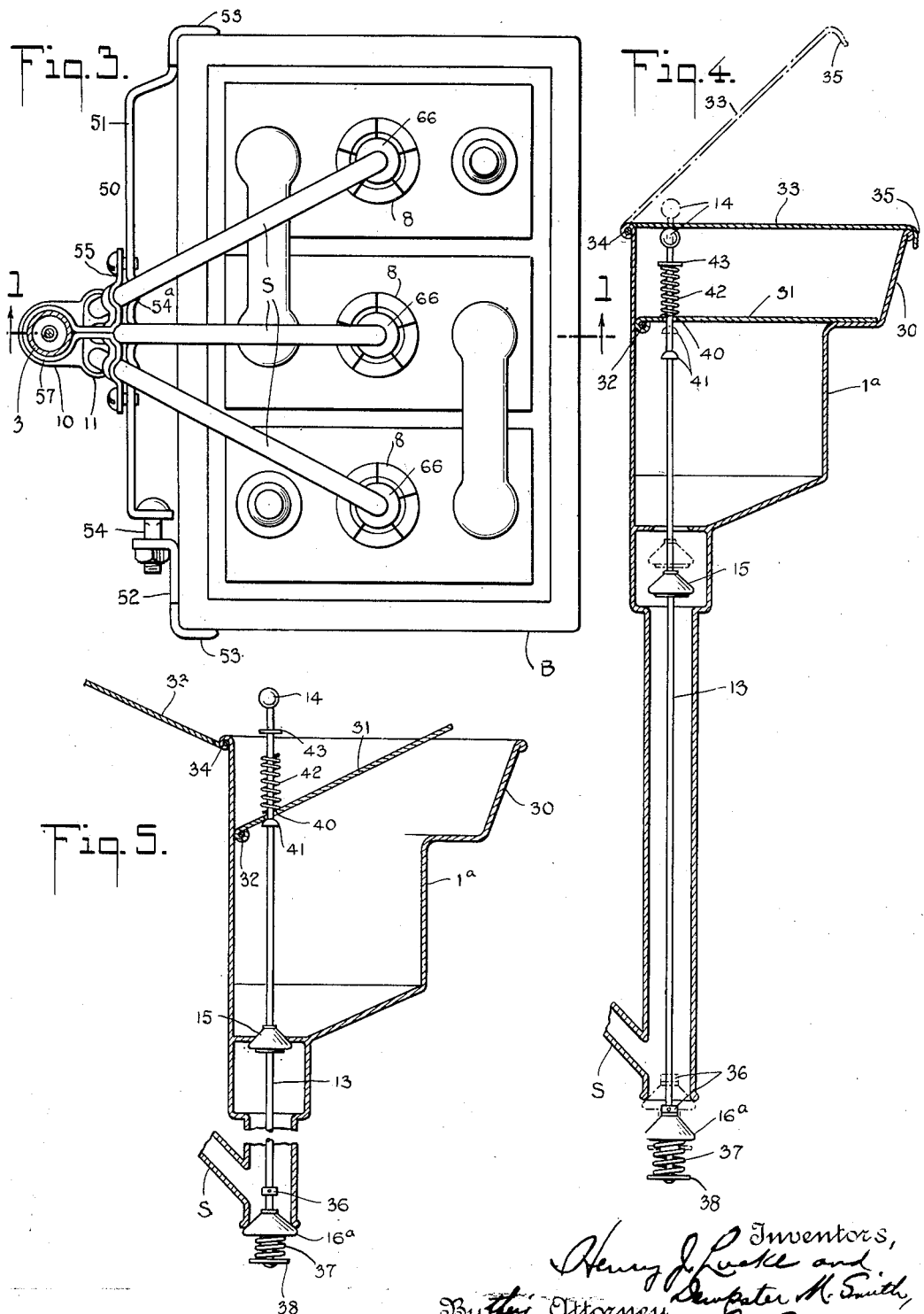

1,926,343

UNITED STATES PATENT OFFICE 1,926,343

RESERVOIR FILLING APPARATUS

Henry J. Lucke, East Orange, N. J., and Dempster M. Smith, New York, N. Y.

Application November 12, 1927
Serial No. 232,748

5 Claims. (Cl. 136—162)

Our invention relates to mechanism or apparatus especially designed for filling and re-filling storage battery jars or cells, although it is adapted or adaptable to the filling of other containers or reservoirs.

The principal purpose is to provide reasonably simple and inexpensive means for quickly refilling one, or simultaneously two or more, cells of a storage battery with distilled water, to restore the predetermined normal level of solution therein, such means including provision against overfilling, wastage of the solution, improper dilution of the solution by physical contact with water in a reservoir, and without complicated and uncertain parts such as float valves, electrical devices or connections, and also dispensing with a tank of refill-water, which would be liable to freezing in winter. The further object is, when desired, to enable the filling to be done without annoying preliminary operations such as lifting the floor boards of a car in which the battery is installed; also to so arrange the mechanism that inspection of the level of solution in the one or more cells is unnecessary.

While as above indicated the invention is especially desirable as applied to storage batteries of automobiles, it is not so limited, and evidently may be employed in connection with almost any storage battery, wherever used.

As briefly described, in the physical embodiments shown, the invention includes a vessel or cup of definite capacity, a generally vertical tube, and a plurality of siphons corresponding in number to the number of battery cells, the short leg of each siphon entering the cell preferably through any known or suitable filler cap, or fitting to be substituted therefor, and the long leg of each siphon communicating with said vertical tube near the bottom thereof; together with valves operated automatically, semi-automatically, or arbitrarily, to insure the proper filling of the cup, then the proper flow of water to the cells, and thereafter a siphon action in which any excess water is withdrawn under conditions preventing improper withdrawal of solution.

The operation of the apparatus in its simpler forms involves waste of a small amount of water; but the advantages of the apparatus in respect to convenience, simplicity and certainty of operation greatly over-balance the small cost of wasted water, especially since in many localities the natural water available is suitable for battery filling, and distilled water is unnecessary.

The characteristics and advantages of the invention are further sufficiently explained in connection with the following detail description of the accompanying drawings, which illustrate certain representative embodiments. After considering these examples, skilled persons will understand that many variations may be made without departing from the principles involved, and we contemplate the employment of any structures that are properly within the scope of the appended claims.

Fig. 1 is a vertical section of apparatus embodying the invention in one form.

Fig. 2 is a section at 2—2, Fig. 1.

Fig. 3 is a top plan.

Fig. 4 is a vertical section of a modified structure.

Fig. 5 is a similar section, condensed, showing another operative position.

Fig. 6 is a top plan of one suitable battery cap.

Figs. 1 to 3 show the device adapted to a storage battery B installed in any usual or convenient location in an automobile, such as below the floorboard, of which F is a portion. The battery is supported by any suitable base or tray such as K.

The filling apparatus comprises a cup 1 having a central discharge opening 2 communicating with a vertical pipe 3. A siphon S is provided for each battery cell, in the present instance three. The device operates with one or any reasonable number of siphons. Each siphon includes a generally-upright, long leg or siphon intake leg 4 and a short leg, the form of which may vary, but conveniently includes a generally-angular or downward-sloping portion 6, and a vertical portion 7 extending through any usual vented filler cap 8 or a special cap which may be substituted for the ordinary filler cap, and designed to properly receive and support the siphon. While the upper portion of the siphon may be of generally curved or arcuate form, the particular form shown is usually preferred since it provides in the parts 6 and 7 a generally upwardly-sloping short leg of substantial length which preferably connects with the upright leg 4 in a bend 9 of substantial sharpness, for reasons mentioned below. The upright legs 4 communicate with the vertical pipe 3 near the bottom thereof, the communicating formations being desirably as straight or direct as possible.

The pipe system in some cases may be practically an integral structure, but preferably, and especially because certain parts are desirably of different materials, certain joints or connections are provided. Thus, we provide a manifold fitting 10 of hard rubber, synthetic resin composition, or other acid-resisting material, bored to form a continuation of the bore of pipe 3, and counterbored at the upper end to receive the lower end of the pipe. The fitting has a side extension 11 containing three siphon passages 12 communicating with the main passage near the lower end thereof, and counterbored to receive the lower ends of the individual long legs 4 of the siphons. The various pipes may be secured in the fitting 10 by means of pins, cement or screw connections. Since the lower end of the siphon member 7 is almost constantly in contact with strong acid solution and other parts of the siphon are sometimes in contact with weaker solution, the siphon proper consisting of the parts 4, 6 and 7, is desirably integral and of acid-resisting material such as hard rubber, synthetic resin or glass.

A valve stem 13 passes through the vertical pipe 3 and the cup 1, and has at its upper end a knob 14. A valve 15 is adjustably or fixedly secured on the stem to cooperate with the upper end of the pipe 3, which serves as a valve seat, and another valve 16 is adjustably or fixedly secured near the lower end of the stem to cooperate with the lower end of the fitting 10 as a valve seat; the valves being so spaced that when one is in closed position the other is in freely open position, as indicated by solid and dotted lines.

Since the lower portion of stem 13 and valve 16 possibly may be subjected to the action of weak acid solution, or fumes, the lower stem portion may consist of a separate member 17 of acid-resisting material such as hard rubber, synthetic resin, etc., the lower end of the stem proper 13 being inserted and secured in the upper end of member 17 in any suitable way, as by screw threads. The valve 16 may be separate, or integral with the stem member 17, and of acid-resisting material.

The location of cup 1 and other parts of the apparatus may be varied as desired, but conveniently the upper end of the cup is located within an opening 20 cut in the floor-board F, this opening being closed by a hinged cover 21, and no other cover for the cup is in such case necessary, although a movable cover may be also provided on the cup, if considered necessary or desirable.

The bottom of cup 1 is located at least as high as the top of the bend or elbow 9; pipe 3 and the long siphon legs 4 are of substantial length in order to insure proper siphon action. Thus, as shown, the vertical distance from the lower end of siphon member 7 to the bottom of fitting 10 is substantially greater than the vertical distance from the lower end of member 7 to the bend 9; although these relative dimensions may be varied considerably in accordance with various considerations of design.

Various additional details, such as supporting devices, filling-opening caps, etc., may vary greatly, and we have chosen to illustrate only representative examples of such appurtenances, which, however, are satisfactory and preferred in some cases. Thus, the filling structure may be supported by a bracket 50, see Figs. 1 and 3, consisting of members 51 and 56, each having a clip or jaw 53 to engage an end of the battery jar. The bracket members are drawn together by a bolt 54 to secure them in adjustable position on the jar. Member 51 is formed to provide sockets 54a for the long siphon legs 4 and these legs are secured by a fitting 55 having complemental sockets. This fitting also has a loop or eye 57 embracing the vertical pipe 3 and secured in any suitable way, adjustably or nonadjustably, thereto. The particular battery cap 8 illustrated has a threaded lower portion 60 to engage in the threaded aperture of the cell in the usual way. The upper portion of the cap is radially divided by slots 61 into segments 62, see Fig. 6, the inner faces of which are contoured to fit the siphon member 7. The peripheries of the segments are tapered as at 63, see Fig. 1, to cooperate with the complemental face of a ring 64 located on top of the cell about its aperture. The upper portion of the cap is formed as a knurled manipulative flange or ring 65. A washer 66, apertured to accommodate the siphon, is placed loosely on top of the cap within the flange 65 to sufficiently exclude extraneous matter. When the siphon member 7 is inserted through the cap and the latter screwed into position in an obvious way, ring 64 acting on the tapered faces 63 causes a clamping action of the segments 62 to secure and retain the siphon member 7 in proper position, and proper venting is provided by the slots 61.

The line L, Fig. 1, denotes the normal level of battery solution, substantially above the tops of the plates P. It may be desirable in many cases to maintain the level of electrolyte normally somewhat above the usual normal level. Thus, where in ordinary practice it is usually sufficient to have this level slightly above the tops of the plates, say ¼ inch, in the use of our invention it is in many cases desirable to have the solution normally at a higher level, say ⅜ to ½ inch above the plates. The position of the lower end of siphon member 7 may vary somewhat in relation to the normal level, but is usually slightly below such level, as indicated.

After a certain period of operation the level of the solution one of the cells or equivalent receptacles will fall to another level such as $L^1$. To refill the battery, see Fig. 1, the floorboard cover 21 is raised, and while the valves are in the position indicated in full lines, in which they will remain until intentionally displaced, distilled water is poured into the cup until it is full, or overflows. Particular care need not be taken to avoid overfilling of the cup, it only being necessary to see that it is substantially filled. Any excess will overflow, and water will not flow from the cup until valve 15 is opened. After filling the cup, knob 14 is pulled up until stopped by engagement of valve 16 with its seat—the lower end of fitting 10—thus opening valve 15, while the lower end of the vertical pipe is closed, thus forming a continuous conduit from the cup through pipe 3 and the siphons S to each individual cell. Water thereupon flows by gravity from the cup through the stated passages until the level in pipe 3 is somewhat below that of elbow 9. Attention of the user is required only to the extent of holding the knob 14 in upward position long enough to empty the cup, which is accomplished in a few moments. In this filling action the liquid position in the cell is raised to another level $L^2$ considerably above the lower end of siphon member 7. The inflow of water ceases when a gravity balance is established between the water in pipe 3 and that in the siphons. The user then releases the knob whereupon valve 15 drops to closed position while valve 16 opens, thus opening the lower end of fitting 10, whereupon water remaining in pipe 3 runs out, and at the same time or immediately thereafter water runs downward through the long leg of each siphon and out of the open end of fitting 10, thus producing by siphon effect an upflow in the short leg 5 of each siphon. The liquid flowing up in the short siphon leg consists first of water remaining in the lower portion thereof by reason of the balancing effect of water in pipe 3 and the long leg 4 after emptying of the cup while valve 15 was closed, and some or all of this water will pass into the long leg and be spilled out at the bottom of pipe 3. Thereafter the liquid drawn up in the short leg consists of a part of the water which had actually gone into the cell, which is more or less mixed with the acid solution, although this does not represent a full-strength mixture, since sufficient time does not elapse in the stated sequence to permit the added water to fully mingle with the solution. The stated upflow in the short legs continues until, at about the time that water which had previously been inserted in the cell is about to reach the elbow 9, the solution level in the battery falls to a point below the lower end of siphon member 7; and thereupon the liquid in the short siphon leg is unsupported, and the column of siphon liquid is broken at the elbow 9 and the water partially mixed with solution which had been drawn up to that point thereupon flows back through the short leg into the cell, restoring the solution therein to the normal level L. The spillage of liquid through the long siphon leg therefore consists entirely or almost entrely of water uncontaminated by acid and there is no, or substantially no, withdrawal of acid from the cell; or if the battery is too frequently refilled, or in any other extreme or abnormal circumstance, it is only a slight amount owing to the relatively slight intermingling of the added water with the battery solution.

The total length of the short siphon leg 5 consisting of the parts 6 and 7 is calculated with reference to the total amount of water to be added to the cell at each filling action and is of sufficient volume to allow the withdrawal of liquid from the cell representing the volume between the upper level $L^2$ immediately after filling and the lower end of siphon member 7, without any or any considerable amount of such liquid passing the elbow 9, and thus avoiding substantially or completely any withdrawal of acid from the cells. The size of cup 1 and dimensions of the pipe system are calculated with regard to the amount of water required to be added to each cell after a normal period of operation, and also with regard to the additional water representing wastage by outflow from pipes 3 and 4.

The filling operation should be performed at fairly regular intervals, depending upon temperature and the severity of service to which the battery is subjected; thus in summer and when the battery is in active use it may be refilled, say, once a week; in milder summer weather or when the service is less severe, about once in two weeks, and in winter about once in four weeks (more or less) and when the filling intervals are regulated with reasonable intelligence any inspection of the solution level is unnecessary, since the device provides for reasonable overfilling in each operation, and withdrawal of excess liquid so that reasonable variation in the drop of solution level in the cells or any one of them is substantially compensated for.

When the solution level is normally maintained, as above specified in preferred cases, substantially higher than is customary in storage battery practice, the battery may run for a longer period than usual before the solution level approaches the tops of the plates. In other words, there is a greater range of level variation than in ordinary practice. This allows for a drop of level considerably below the lower end of member 7; the filling action may then bring the level only up to such lower end, slightly above it, or slightly below it, depending upon the level previous to filling, and in such cases evidently the siphon action will withdraw very little liquid, or no liquid from the cell. Thus, if the level after filling is only slightly above the nose of member 7, the upflow in the short leg will consist almost entirely of water remaining therein at the end of the filling action, only a very slight amount being withdrawn from the cell until the level falls below the nose of member 7. If the level after filling was at or below the stated point, there will be no withdrawal from the cell. Therefore, it is evident that if the battery is operated in the manner just indicated, and filling is done at proper intervals indicated by observation of the normal drop in level (or, in other words, upon data which may be determined by the battery or car manufacturer and communicated to the user in the form of simple directions), there will be no withdrawal of solution from the cell.

Figs. 4 and 5 sufficiently illustrate a modification involving slight additional complications, and intended to guard against extremely careless or thoughtless use of the simpler apparatus of Figs. 1 and 2. The cup has an extension 30 to cooperate with an inner lid or cover 31 hinged at 32. An upper or top cover 33 is also provided, hinged at 34 and having a snap fastening 35. In such case the floorboard cover 21 of Fig. 1 may be dispensed with, or in some cases the upper cover 33 on the cup may be omitted. Valve 15 is fixed on the valve stem 13 as in the previous case, but valve 16a is slidably mounted on the stem and is arranged to cooperate with a stop 36 thereon, and a spring 37 located between the lower end of the valve and an abutment washer 38. The upper portion of the stem passes through an aperture 40 in the inner cover 31 and is provided with a stop 41 to engage the lower face of the cover, and a spring 42 is arranged between the cover and a stop washer 43 on the stem. Knob 14 on the upper end of the stem is desirably so positioned that it is in elevated position and close to the cover 33 when the latter is raised, and conversely, so that the upper cover must be in raised position to give access to the knob.

In this form of the invention, in order to fill the cup it is necessary first to raise the upper cover 32 when such cover is provided, and then to raise the inner cover 31 by pulling upward on knob 14 whereupon stop 41 effects the raising of the inner cover as shown in Fig. 5 to allow proper filling of the cup and at the same time to insure that valve 15 is in closed position as filling is performed and until the cup is filled to the proper level, since the knob must be retained in its upward position thus holding the inner cover in open position until filling is completed. Thereupon the knob is released and spring 37 reacting against valve 16a which has been in the meantime held in closed position by the spring and the upward pull on knob 14, retracts the valve stem downward until stop 36 strikes valve 16a. The inner cover 31 is at that time closed and valve 15 is open, permitting the water to run through the pipes in the previously described manner and fill the battery.

Knob 14 must then be further depressed either arbitrarily or by the act of closing the outer cover 33, and this depression of the knob causes further depression of the valve stem with accompanying compression of spring 42, whereupon stop 36 causes the positive opening of valve 16a and the siphon action above previously described. The time and attention required for the stated manipulation of the valve stem and cover 33 practically insure that the filling and siphon actions shall be properly performed, even by careless or unskilled users.

The position of knob 14 may be varied. Thus, if it is located normally somewhat higher than as shown in Fig. 4, its relation to the outer cover 33 will be such that the cover cannot be shut until the knob is pushed down somewhat. Otherwise the knob may be so positioned that the act of closing the outer cover pushes it down sufficiently to properly position the valves for the siphon action.

In addition to the automatic equalizing effect or action of the appliance as above described, it will be noted that there is no necessity for any tank or reservoir of refill water, which cannot be treated with anti-freeze mixture on account of the chemical effect of such materials on the battery acid, and which would therefore be liable to freeze in winter; there is no liquid contact between the battery solution and any outside body of water, which would cause gradual dilution of the solution or withdrawal of a part of the solution into the storage body of water; the pipe system is entirely dry after the filling action; there is no need for float valves or electrical circuits, contacts or controls; and while a certain amount of wastage of refill water is involved this is relatively unimportant in comparison with the convenience of easy, quick, positive and correct refilling without necessity for inspection of the cell levels or other annoying operations such as removal of floorboards, etc. or separate filling of a plurality of cells with a syringe or still more primitive appliance; and the risk of under- or over-filling involved in such arbitrary supply of water to the individual cells without any definite guide as to the proper level.

In addition to the capacity of the appliance by its siphonic action to regulate or equalize liquid levels in one or a plurality of associated vessels as above explained, it also has an inherent characteristic or tendency to equalize the liquid levels in associated vessels in the filling operation, as distinguished from the siphonic action. A single example is sufficiently illustrative of this characteristic. In a three cell battery it frequently happens that on account of peculiarities of the respective cells the level in at least one of them falls more rapidly or to a lower point in the level in another cell or cells. This would be indicated in Fig. 1 by the level L' after a substantial service period falling considerably below the nose of the short siphon leg, say, to a point flush with the tops of the plates or to even a lower level. The level L' in one or more of the other cells might at that time be substantially as indicated in Fig. 1. In such a case when the cup is filled and its contents permitted to flow to the cells, it is evident that in a very brief time the liquid in the higher level cells will contact with and close the noses of the respective short siphon legs, whereupon the weight of liquid in such short legs is partly supported by such contact and the inflow is correspondingly retarded, if not entirely stopped, while the flow to the lower level cell is unimpeded; or at least the liquid will tend to flow faster into that cell, until the nose of the corresponding short siphon leg is reached by the liquid; and thereafter the flow is equalized or stopped practically simultaneously with respect to all of the siphons. It is therefore evident that the device has a very substantial liquid-charge-regulating or level equalizing capacity, even without regard to the action of the siphons in withdrawing liquid after filling.

We claim:

1. Apparatus for filling a plurality of receptacles comprising a cup, a pipe communicating with a lower portion of the cup and extending generally downwardly therefrom, the pipe having an opening communicating with the atmosphere, a plurality of siphons corresponding to such receptacles, said siphons respectively having their long legs connected to the pipe near the lower end thereof, means for mounting the cup to elevate the cup above the highest part of the siphons and valve means selectively controlling liquid flow from the cup through the pipe to the siphons and reverse flow through the siphons, and through the pipe through its atmosphere-communicating opening, said valve means including a valve controlling the communication of the cup with the pipe and a valve controlling the discharge of the pipe communicating with the atmosphere and means interconnecting the first-named valve with the second-named valve to open the second-named valve when the first-named valve is closed and to open the first-named valve when the second-named valve is closed, said pipe being otherwise closed at all locations at levels lower than the top level of the siphons when the first mentioned valve is open, said atmospheric-communicating opening being located at an elevation lower than that of the siphon intakes.

2. Apparatus for filling a plurality of receptacles comprising a cup, a pipe communicating with a lower portion of the cup and extending generally downwardly therefrom, the pipe having an opening communicating with the atmosphere, a plurality of siphons corresponding to such receptacles, said siphons respectively having their long legs connected to the pipe near the lower end thereof, means for mounting the cup to elevate the cup above the highest part of the siphons and valve means selectively controlling liquid flow from the cup through the pipe to the siphons and reverse flow through the siphons, and through the pipe through its atmosphere-communicating opening, said valve means including a valve controlling the communication of the cup with the pipe and a valve controlling the discharge of the pipe communicating with the atmosphere and means interconnecting the first-named valve with the second-named valve to open the second-named valve when the first-named valve is closed and to open the first-named valve when the second-named valve is closed, the siphons each also including a short leg tending generally downward and joining the long leg in a substantially sharp bend, the end of said short leg being located in a vessel with reference to a desired normal liquid level therein, said pipe being otherwise closed at all locations at levels lower than the top level of the siphons when the first mentioned valve is open, said atmospheric-communicating opening being located at an elevation lower than that of the siphon intakes.

3. Apparatus for filling a battery of receptacles comprising a cup, a pipe communicating with a lower portion of the cup and extending substantially vertically downwardly therefrom, a fitting of acid-resisting material to which the lower end of the pipe is connected, the fitting also having siphon passages communicating with its main bore which forms substantially a continuation of the vertical pipe, a plurality of siphons composed largely of acid-resisting material, each having the lower end of its long leg connected to one of the siphon passages of said fitting, means for mounting the cup to elevate the cup above the highest parts of the siphons, a valve stem passing through the cup, the vertical pipe and the main bore of the fitting, a valve fixedly carried by the valve stem, at the upper end of the vertical pipe to control flow from the cup to the pipe, and another valve carried by the lower end of the stem to selectively open and close the lower end of the main bore of the fitting, to open the second-named valve when the first-named valve is closed and to open the first-named valve when the second-named valve is closed, said main bore of the fitting being open to the atmosphere when the valve associated with the fitting is in open position.

4. A system for filling a battery of receptacles comprising a filling cup of capacity determined with relation to an amount of liquid to be supplied to the receptacles, a pipe system connected to a lower portion of the cup and including a generally vertical pipe and a multiple siphon the long leg of each siphon component being connected to the pipe near the lower end thereof, each siphon component also including a generally downwardly-tending short leg, the end of which is located in one of the receptacles with relation to a desired liquid level therein, the pipe having an opening communicating with the atmosphere, means for mounting the cup to elevate the same above the highest portion of the siphon and controlling means including interconnected valves capable of positioning to close the cup during filling thereafter to open the cup and to close the lower end of the pipe system while liquid is supplied from the cup by said system to the receptacles, and finally to open the pipe system at a low point through said opening communicating with the atmosphere thus producing a siphon action and reverse flow of liquid through the multiple siphon, said pipe being otherwise closed at all locations at levels lower than the top level of the siphons when the first mentioned valve is open, said atmospheric-communicating opening being located at an elevation lower than that of the siphon intakes.

5. In combination with a battery of receptacles, filling apparatus comprising a cup, a pipe connected to a lower portion of the cup and depending from said cup, a plurality of siphons connected to said pipe, each siphon having an upwardly extending long leg and a descending short leg, said descending legs respectively entering said receptacles and terminating at predetermined locations relative to the inner dimensions of said receptacles respectively, the pipe having an opening communicating with the atmosphere, means for mounting said cup to elevate said cup above the highest portion of said siphons, valve means for controlling the flow of water from said cup through said pipe and said siphons and the return flow of excess liquid from said receptacles through said descending leg portions respectively, said valve means including a valve controlling the communication of the cup with the pipe, a valve controlling the discharge of the pipe communicating with the atmosphere and manually operated means for interconnecting said first-named valve with said second-named valve to open the second-named valve when the first-named valve is closed and to open the first-named valve when the second-named valve is closed, said valve controlled opening leading to the atmosphere being at an elevation which is lower than that of the intake ends of the siphon, said pipe having no opening leading to the atmosphere from an elevation lower than that of the top level of the siphon at the time when the first mentioned valve is open.

HENRY J. LUCKE.
DEMPSTER M. SMITH.